United States Patent
Sieksmeier et al.

(10) Patent No.: US 9,815,635 B2
(45) Date of Patent: Nov. 14, 2017

(54) CONVEYOR DEVICE AND METHOD FOR THE AUTOMATED CONVEYANCE OF INDIVIDUAL PRODUCTS

(71) Applicant: Dürkopp Fördertechnik GmbH, Bielefeld (DE)

(72) Inventors: Dirk Sieksmeier, Spenge (DE); Markus Merten, Bielefeld (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 14 days.

(21) Appl. No.: 14/602,386

(22) Filed: Jan. 22, 2015

(65) Prior Publication Data

US 2015/0210482 A1    Jul. 30, 2015

(30) Foreign Application Priority Data

Jan. 24, 2014 (DE) .................. 10 2014 201 301

(51) Int. Cl.
*G06F 7/00* (2006.01)
*B65G 43/08* (2006.01)
(Continued)

(52) U.S. Cl.
CPC .......... *B65G 43/08* (2013.01); *B65G 1/0457* (2013.01); *B65G 1/1371* (2013.01); *B65G 2201/0229* (2013.01); *B65G 2203/0266* (2013.01)

(58) Field of Classification Search
USPC ....................................................... 700/230
See application file for complete search history.

(56) References Cited

U.S. PATENT DOCUMENTS 5,072,822 A * 12/1991 Smith ................. B07C 5/3412
                                                         198/349
5,269,402 A * 12/1993 Speckhart ............. B65G 33/02
                                                         198/416
(Continued)

FOREIGN PATENT DOCUMENTS

DE        19536313 A1    4/1997
DE        29804038 U1    5/1998
(Continued)

OTHER PUBLICATIONS

European search report dated Jun. 10, 2015, in corresponding European appl. No. 15150740.7, with relevance of cited identified using category designations references/document.

*Primary Examiner* — Kyle Logan

(74) *Attorney, Agent, or Firm* — Browdy and Neimark, PLLC

(57) ABSTRACT

A conveyor device for the automated conveyance of individual products in a direction of conveyance, the conveyor device being configured as a hanging conveyor device, comprises several adapters each provided with an adapter identification means for accommodating the individual products, wherein each individual product comprises an individual product transponder, a transponder reading unit for reading individual product data of the individual product transponder, an adapter data reading unit for reading adapter data of the adapter identification means, a control unit which is in signal communication with the transponder reading unit and the adapter data reading unit for linking the individual product data read by means of the transponder reading unit with the adapter data read by means of the adapter data reading unit.

15 Claims, 1 Drawing Sheet

(51) Int. Cl.
*B65G 1/04* (2006.01)
*B65G 1/137* (2006.01)

(56) References Cited

U.S. PATENT DOCUMENTS

| | | | | |
|---|---|---|---|---|
| 5,377,814 A | * | 1/1995 | Smith | B07C 5/3412 |
| | | | | 198/465.4 |
| 5,799,769 A | * | 9/1998 | Heer | B65G 19/025 |
| | | | | 198/349 |
| 5,975,279 A | * | 11/1999 | Blattner | B65G 33/02 |
| | | | | 198/459.4 |
| 2004/0144843 A1 | * | 7/2004 | Fabre | B65G 1/1376 |
| | | | | 235/385 |
| 2010/0070070 A1 | * | 3/2010 | Stemmle | B07C 3/082 |
| | | | | 700/215 |
| 2010/0134253 A1 | | 6/2010 | Mader | |

FOREIGN PATENT DOCUMENTS

| | | |
|---|---|---|
| DE | 102011103194 A1 | 12/2012 |
| EP | 1690811 A1 | 8/2006 |
| WO | 2006110484 A1 | 10/2006 |
| WO | 2008144945 A2 | 12/2008 |
| WO | 2012163780 A1 | 12/2012 |

\* cited by examiner

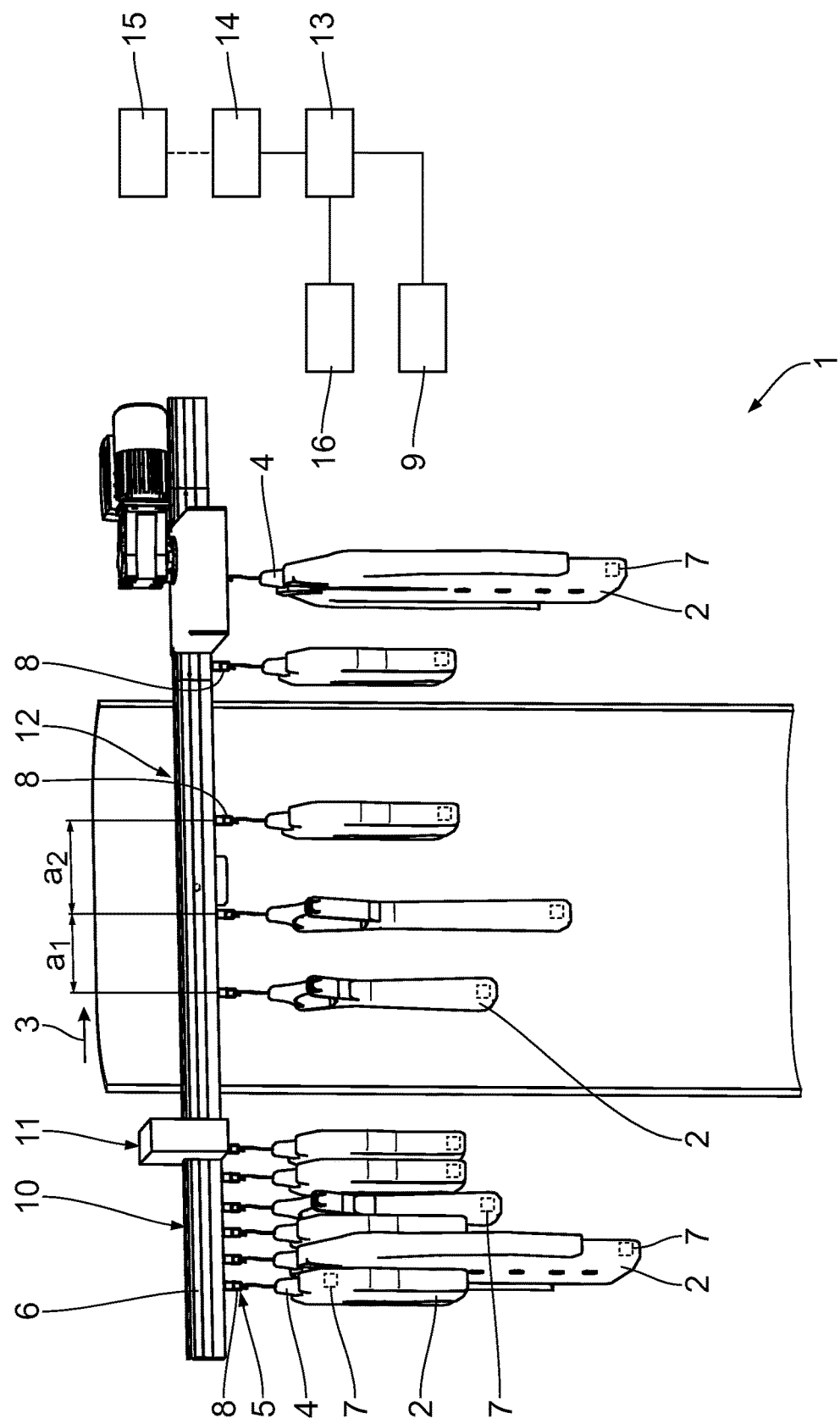

CONVEYOR DEVICE AND METHOD FOR THE AUTOMATED CONVEYANCE OF INDIVIDUAL PRODUCTS

CROSS-REFERENCE TO RELATED APPLICATIONS

This application claims the priority of German Patent Application Serial No. DE 10 2014 201 301.1, filed on 24 Jan. 2014, pursuant to 35 U.S.C. 119(a)-(d), the content of which is incorporated herein by reference in its entirety as if fully set forth herein.

FIELD OF THE INVENTION

The invention relates to a conveyor device and to a method for the automated conveyance of individual products, hereinafter also referred to as products.

BACKGROUND OF THE INVENTION

A method for conveying products on hangers is known from DE 195 36 313 A1. A hanging conveyor system has an identification unit for identifying coded material. This allows the coded material to be conveyed to a particular discharge region.

SUMMARY OF THE INVENTION

An object of the present invention is to provide a conveyor device in which the automated conveyance of products is facilitated, in particular to make the handling of the products easier for a receiver of the products.

This object is achieved by a conveyor device for the automated conveyance of individual products in a direction of conveyance, the conveyor device being configured as a hanging conveyor device which comprises several adapters with in each case one adapter identification means for accommodating the individual products, each individual product comprising an individual product transponder, a transponder reading unit for reading individual product data of the individual product transponder, an adapter data reading unit for reading adapter data of the adapter identification means, and a control unit which is in signal communication with the transponder reading unit and the adapter data reading unit for linking the individual product data read by means of the transponder reading unit with the adapter data read by means of the adapter data reading unit. It was recognized according to the invention that two identification means are used for easier identification of an individual product. An adapter is provided with an adapter identification means. The adapter identification means is an identifier of the adapter and may for instance be configured as an adapter transponder or as a barcode. An adapter is configured to accommodate the products. In particular, one adapter is provided for one product each. Furthermore, each product is provided with a product transponder serving as individual product identification means. The conveyor device further comprises a transponder reading unit for reading product data of the product transponder. The transponder reading unit in particular comprises several separate transponder readers. The transponder readers are adapted to read out the respective product transponders separately and individually from each other, in particular by means of a transponder antenna. The individual transponder readers are arranged in space such as to be spaced from each other. Several transponder signals are thus detectable and—if necessary— comparable to each other independently from each other. The reliability of reading out the product transponder is thus improved. Product data are data referring to the product as such, for instance the type of the product, in particular piece of clothing, and in particular jacket, trousers, coat, blouse, suit, shirt or other. Other product data may include for instance the production date, the size, the color, the designer or manufacturer, the sales price. The product adapter is in particular integrated into the product which is in particular configured as a piece of clothing. The product adapter is sewn into the piece of clothing. The conveyor device further comprises an adapter data reading unit for reading adapter data provided by the adapter identification means. Adapter data are in particular in the form of an identification code as primary key which clearly identifies the respective adapter. This code may for instance be configured as a unique identification number. Other adapter data may for instance be data concerning the type and/or size of the adapter. In particular, the adapter data may also comprise a potential receiver of the products. The conveyor device further comprises a control unit which is in signal communication with the transponder reading unit and with the adapter data reading unit for linking the product data read by means of the transponder reading unit with the adapter data read by means of the adapter data reading unit. Linking the data to each other is also referred to as marrying. When the data are married to each other, the product-related product data are linked to the adapter data which are required substantially for handling the adapter in the conveyor device. As such the respective product data can be clearly assigned to one particular adapter. It is conceivable for the two different data sets, in other words the adapter data and the product data, to be combined in one common data set. As the position of the adapter identification means on the adapter is known a priori and is in particular the same for all adapters, the adapter identification means is readable particularly easily and securely, in other words the failure probability is kept to a minimum. Reading said data is for instance carried out by a receiver of the products when performing an incoming goods inspection allowing for further handling of the products. A clear identification of the products may for instance take place such that only the adapter identification means is read which allows for direct and simple identification of the already known product data linked therewith. Linking the data sets is especially advantageous if the products are pieces of clothing since a position of the product transponder at the respective product is not known a priori. The product transponder may for instance be provided on the respective product in various positions. This allows a receiver of the products to detect the product data more easily by reading out the product transponder. Reading out the product data in an isolated manner is not necessary. As such it is not necessary for customer, in other words a receiver of the products who receives products handled in this manner, to provide a separate anti-theft device as each of the products is provided with a respective product transponder. The receiver of the products does not require a separate barcode reader either. A transponder reader, which is in most cases already available at the receiving site, facilitates the incoming goods inspection. It is in particular conceivable to detect a plurality, in particular a bulk, of products such as 20 or more products, in particular at the same time. This substantially enhances the efficiency of performing an incoming goods inspection when the product is provided, compared to an identification barcode since barcodes must be read individually, in other words one after the other. The conveyor device according to the invention facilitates the handling, in particular the automated conveyance, of products. The handling of the products is particularly easy for a receiver of the products.

In an advantageous embodiment, the conveyor device comprises a feed conveyor for feeding the products. This in particular allows the conveyor device to be connected to a warehouse, for instance to prepare products provided in a warehouse, which may be configured as an intermediate storage facility or a high-bay warehouse, for order picking and subsequent delivery to a receiver of the products.

In an advantageous embodiment, the conveyor device comprises a separating unit arranged in the direction of conveyance when seen downstream of a feed conveyor for separating the products. As such the products provided via the feed conveyor can be provided for further handling in the conveyor device, in particular for a defined transport and/or for reading out the transponder data, in a defined manner.

In an advantageous embodiment, the conveyor device comprises a carrier conveyor for carrying transport of the products. The carrier conveyor in particular allows for a defined transport of the products.

In a particularly advantageous embodiment of the conveyor device, the carrier conveyor is provided with several carriers for transporting one adapter each in the direction of conveyance. A carrier distance between two adjacent carriers in the direction of conveyance is in particular variably adjustable. The carrier distance is at least equal to a critical minimum carrier distance. This ensures that two adapters with products attached thereto are spaced from each other in the carrier conveyor when seen in the direction of conveyance such that the data of the product transponder are reliably detectable by means of the transponder reading unit. The length of the minimum carrier distance depends on the respective size of the transponder reader of the transponder reading unit. The minimum carrier distance also depends on a carrier speed required for displacing the carriers along the carrier conveyor. The minimum carrier distance may also facilitate detection of the adapter data. The minimum carrier distance allows for easier detection of the adapter data in particular if the adapter identification means is an adapter transponder. If the adapter identification means is a barcode, the minimum carrier distance additionally facilitates detection of the barcode by means of a barcode reader.

In another advantageous embodiment, various carrier distances are settable. This may for instance be achieved in a predefined manner by means of a carrier spacer grid. Arranging the carrier at a selected grid position of the carrier spacer grid allows a carrier distance to be set quickly, easily and more precisely. It is conceivable as well for the carrier distances to be continuously variable. In this case, the carrier distances may be set according to requirements, in particular depending on the products to be conveyed.

In a particularly advantageous embodiment of the conveyor device, the carrier conveyor has a carrier drive system for driving the carriers. The carriers are driven at a carrier speed. The carriers speed is in particular variable. The carrier drive system is for instance configured as a circulating chain drive system arranged in the region of the carrier conveyor. A drive chain wheel may be driven by an electric motor with a variable rotational speed.

In an advantageous embodiment of the conveyor device, the transponder readers of the transponder reading unit are arranged in the region of the carrier conveyor. The separated products are conveyed such as to be arranged at a minimum carrier distance from each other in the region of the carrier conveyor, thus ensuring a reliable detection of the products. It is in particular excluded that adjacent products and/or adapters overlap such as to prevent a clear assignment of adapter data and product data. This means that in each reading process, the transponder reading unit in the region of the carrier conveyor reads exactly one set of product data. The data thus read are transmitted to the control unit where they are linked with exactly one set of adapter data in particular detected by means of the adapter identification means.

In an advantageous embodiment of the conveyor device, the adapter is adapted to accommodate a clothes hanger. The clothes hanger may carry a product in the form of a piece of clothing. Conveyance and handling of pieces of clothing provided on clothes hangers, in other words so-called hanging goods, is facilitated.

In an advantageous embodiment, the conveyor device comprises a data transmission unit for transmitting the data linked in the control unit to a data receiving unit. The data receiving unit is in particular remote from the conveyor device. The data receiving unit may for instance be installed at the product receiver. The connection for transmitting data from the data transmission unit of the conveyor device to the data receiving unit may be wired or wireless. It is conceivable as well to provide a mobile data carrier such as a memory card, for instance in the SD, CF or micro SD format. It is conceivable as well to use a mobile data carrier in the form of a memory stick, such as a USB stick.

Another object of the present invention is to simplify a method for the automated conveyance of products in a hanging conveyor device.

This object is achieved by a method for the automated conveyance of individual products in a hanging conveyor device in a direction of conveyance, the method comprising the method steps of accommodating one individual product each by means of an adapter, wherein each adapter is provided with an adapter identification means, and each individual product is provided with an individual product transponder, reading adapter data of the adapter identification means by means of an adapter data reading unit, reading individual product data of the individual product transponder by means of a transponder reading unit, linking the individual product data read by means of the transponder reading unit with the adapter data read by means of the adapter data reading unit using a control unit which is in signal communication with the transponder reading unit and the adapter data reading unit. The advantages of the method according to the invention correspond to the advantages of the conveyor device to which reference is made herewith.

An exemplary embodiment of the invention will hereinafter be explained in more detail with reference to the drawing.

BRIEF DESCRIPTION OF THE DRAWING

FIG. 1 shows a perspective view of a conveyor device according to the invention.

DESCRIPTION OF THE PREFERRED EMBODIMENT

A conveyor device the entirety of which is designated by reference numeral 1 is used for the automated conveyance of products 2 in a direction of conveyance 3. The conveyor device 1 is configured as a hanging conveyor device. This means that the products 2 are transported, in other words conveyed, in a hanging manner. According to the illustrated exemplary embodiment, the products 2 are pieces of clothing. Each piece of clothing 2 is hung on a respective clothes hanger 4. Each clothes hanger 4 is secured to an adapter 5 provided for this purpose. The adapter 5 is guided in a transport rail 6 for displacement in the direction of conveyance. An adapter of this type is for instance known from EP 1 690 811 A1 to which reference is made herewith.

Each product 2 is provided with a product transponder 7 shown by dashed lines in the schematic view according to FIG. 1. This means that the product transponder 7 is in each case integrated into the respective product 2. The product transponder 7 is provided with product data.

Each adapter 5 is provided with an adapter identification means in the form of an adapter transponder 8. The adapter transponder 8 is provided with adapter data. The adapter transponder 8 is in particular arranged in a fixed position of the adapter 5. This means that the adapter transponder 8 is arranged at a comparatively small surface area of the adapter 5. The adapter reading unit 16 is aligned with the defined position of the adapter transponder 8, in other words the corresponding surface area. The position of the adapter transponder 8 on the adapter 5 is in particular predefined such that the adapter transponder 8 is readable by means of an adapter data reading unit 16. The adapter data reading unit 16 may be a transponder reader if the adapter identification means is the adapter transponder 8. If the adapter identification means is a barcode, the adapter data reading unit is a barcode reader. Since the adapter transponder 8 is arranged at a previously known position which is identical for all adapters 5, the reliability when reading out the data is enhanced.

A transponder reading unit 9 allows the product data of the product transponder 7 to be read out. The transponder reading unit 9 may comprise several transponder readers which are not shown in detail in FIG. 1. As the position of a product transponder 7 in the respective product 2 is not known a priori, the transponder reading unit 9 is configured such that a comparatively large surface area is detected by the transponder reading unit 9 in a direction transverse, in particular perpendicular, to the direction of conveyance 3. The size of the surface area is in particular predefined such that the surface area is larger than a largest product 2 to be transported. This ensures that a product transponder 7 arranged in a random product 2 is reliably detectable and readable by means of the transponder reading unit 9. The transponder reading unit 9 may be used for reading out both the product transponder 7 and the adapter transponder 8.

Seen in the direction of conveyance 3, the conveyor device 1 has a feed conveyor 10, a separating unit 11 arranged downstream of the feed conveyor 10, and a carrier conveyor 12 arranged downstream of the separating unit 11.

The simplest embodiment of the feed conveyor 10 is configured as a transport rail 6 inclined relative to the horizontal so that the adapter 5 with the clothes hangers 4 and products 2 carried thereby are conveyed in the direction of conveyance 3 as a result of gravity. It is conceivable as well for the feed conveyor 10 to be provided with an active conveying member which is in particular driven to allow conveyance of the adapters 5.

The separating unit 11 is used to prepare the adapters 5 with the products 2 attached thereto for further handling, in particular for reading the adapter data and the product data. To this end, the separating unit 11 is provided with at least one stopper to ensure that the adapters 5 are conveyed through the separating unit 11 in the direction of conveyance 3 in a defined, in particular precisely synchronized manner. The adapters 5 are separated and released by the separating unit 11 in a defined manner for further transport to the carrier conveyor 12. The carrier conveyor 12 exhibits several carriers (not shown). The carriers are used to transport one adapter 5 each in the direction of conveyance 3. As such a carrier distance a between two adjacent carriers in the direction of conveyance 3 is adjustable. The carrier distance is in particular variably adjustable. According to the exemplary embodiment shown in FIG. 1, a first carrier distance $a_1$ and a second carrier distance $a_2$ are shown.

The distances $a_1$, $a_2$ differ from each other. In any case, however, a random carrier distance a, in other words in particular $a_1$ and $a_2$, is at least equal to a critical minimum carrier distance $a_{min}$. According to the illustrated exemplary embodiment, the minimum carrier distance $a_{min}$ is for instance between 250 mm and 700 mm, in particular between 300 mm and 600 mm, and in particular approximately 500 mm. If a minimum carrier distance $a_{min}$ is selected that is too small, it is no longer possible to clearly distinguish two consecutive pieces of clothing in the direction of conveyance 3. If a carrier distance is selected that is too large, the throughput of products, in other words the number of products 2 conveyed per unit time, is reduced, thus resulting in a reduced productivity of the conveyor device 1. The minimum carrier distance $a_{min}$ ensures that the product data and the adapter data are reliably readable by means of the transponder reading unit 9. To this end, the transponder reading unit 9 is arranged in the region of the carrier conveyor 12. The transponder reader is in particular arranged perpendicular to the direction of conveyance 3 in the region of the carrier conveyor 12. The transponder reading unit 9 may be inclined relative to the horizontal to facilitate the simultaneous detection of the product transponder 7 and of the adapter transponder 8. According to the illustrated exemplary embodiment, a simultaneous detection of the product transponders 7 and of the adapter transponders 8 is however not intended. As far as its vertical arrangement is concerned, the transponder reading unit 9 is in particular aligned between a vertical position of the product transponder 7 and of the adapter transponder 8.

According to the illustrated embodiment, the carrier distances a are variable, in other words adjustable in a predefined manner, by inserting the carriers into a carrier spacer grid provided for this purpose. The carrier spacer grid may for instance be configured in the form of a chain drive system serving as a carrier drive system. Chain links may form receptacles for in each case one of the carriers. The carrier drive system is used for driving the carriers, wherein in particular a carrier speed is variably adjustable. The carrier speed of the carrier amounts to approximately 50 m/min to 60 m/min, in other words approximately 1 m/s. This corresponds to a delivery rate of about 5000 to 6000 products 2 per hour.

The transponder reading unit 9 is in signal communication with a control unit 13. The control unit 13 is in signal communication with a data transmission unit 14. It is conceivable for the data transmission unit 14 to be integrated into the control unit 13. The data transmission unit 14 allows a data transfer to an in particular remote data receiving unit 15. The transmission of data may for instance take place via a wired or wireless connection or by means of a mobile data memory. This is shown in FIG. 1 by means of a dashed line between the data transmission unit 14 and the data receiving unit 15. The data receiving unit 15 is in particular installed at a receiver of the products 2.

The following section describes a method for the automated conveyance of the products 2 with reference to the functioning of the conveyor device 1. The products 2 are attached to clothes hangers 4 in a receptacle of the adapter 5 provided for this purpose. The adapters 5 with the products 7 attached thereto are conveyed via the feed conveyor 10 of the conveyor device 1. When reaching the separating unit 11, the products 2 are separated from each other. The adapters 5 are transferred to the carrier conveyor 12 in a defined manner. The adapters 5 with the products 2 attached thereto are transported in the carrier conveyor 12 by means of fixed carriers. The distance between two adapters 5 defined by the carrier distances a is especially important for further handling. The sufficient distance between two adjacent products 2 allows the product data provided by the product adapter 7 and the adapter data provided by the adapter transponder 8 to be read out. The product data read by the transponder reading unit 9 and the adapter data read by the adapter data reading unit 16 are transmitted to a control unit 13. In the control unit 13, the adapter data are linked with the respective product data. By means of the control unit 13, the data thus linked are transmitted to the data receiving unit 15 via the data transmission unit 14. The data receiving unit 15 is in particular installed at a receiver of the products 2. In order for the product receiver to clearly identify the products 2, all that is necessary is to read the adapter data provided by the adapter transponder 8 by means of a transponder reader. The product receiver does not have to read the product data provided by the product transponder 7 as the product data are linked with the adapter data, said linked data being provided to the product receiver. The product receiver is able to clearly identify the products 2 by means of the linked data sets. The method is easy and fail-safe.

What is claimed is:

1. A conveyor device for the automated conveyance of individual products in a direction of conveyance, the conveyor device being configured as a hanging conveyor device which comprises:
   a) several adapters with in each case one adapter identification means for accommodating the individual products, each individual product comprising an individual product transponder, wherein each individual product is attached to a clothes hanger, which is arranged in a receptacle of one of the adapters,
   b) a transponder reading unit for reading individual product data of the individual product transponder,
   c) an adapter data reading unit for reading adapter data of the adapter identification means,
   d) a control unit in signal communication with the transponder reading unit and the adapter data reading unit for linking the individual product data read by the transponder reading unit with the adapter data read by the adapter data reading unit,
   e) a carrier conveyor for carrying the individual products, wherein the transponder reading unit is arranged in a region of the carrier conveyor,
   wherein the carrier conveyor has several carriers for carrying one adapter each in the direction of conveyance, and
   wherein a carrier distance between each two adjacent carriers is independently and variably adjustable in the direction of conveyance.

2. A conveyor device according to claim 1, comprising a feed conveyor for feeding the individual products in the conveyor device.

3. A conveyor device according to claim 1, comprising a separating unit arranged downstream of a feed conveyor when seen in the direction of conveyance for separating the individual products from each other.

4. A conveyor device according to claim 1, wherein various carrier distances are adjustable in a predefined manner by means of a carrier spacer grid.

5. A conveyor device according to claim 1, wherein various carrier distances are adjustable continuously.

6. A conveyor device according to claim 1, wherein the carrier conveyor has a carrier drive system for driving the carriers at a carrier speed.

7. A conveyor device according to claim 6, wherein the carrier speed is variably adjustable.

8. A conveyor device according to claim 1, wherein the adapter is adapted to accommodate a clothes hanger, with an individual product configured as a piece of clothing being hung up thereon.

9. A conveyor device according to claim 1, comprising a data transmission unit for transmitting the data linked in the control unit to a data receiving unit.

10. A method for the automated conveyance of individual products in a hanging conveyor device in a direction of conveyance, the method comprising:
    accommodating one individual product each by means of an adapter, wherein each adapter is provided with an adapter identification means, and each individual product is provided with an individual product transponder, wherein each individual product is attached to a clothes hanger, which is arranged in a receptacle of one of the adapters,
    reading adapter data of the adapter identification means by means of an adapter data reading unit,
    reading individual product data of the individual product transponder by means of a transponder reading unit,
    linking the individual product data read by means of the transponder reading unit with the adapter data read by means of the adapter data reading unit using a control unit which is in signal communication with the transponder reading unit and the adapter data reading unit,
    carrying the individual products by a carrier conveyor, wherein the transponder reading unit is arranged in a region of the carrier conveyor,
    wherein the carrier conveyor has several carriers for carrying one adapter each in the direction of conveyance, and
    wherein a carrier distance between each two adjacent carriers is independently and variably adjustable in the direction of conveyance.

11. A method according to claim 10, comprising a transmission of the data linked in the control unit to a data receiving unit via a data transmission unit.

12. A method according to claim 10, comprising separating the individual products for the carrier conveyor by using a separating unit arranged upstream of the carrier conveyor in the direction of conveyance.

13. A method according to claim 10, wherein the adapter data and the individual products data are read during carrying transport.

14. A conveyor device for the automated conveyance of individual products in a direction of conveyance, the conveyor device being configured as a hanging conveyor device which comprises:
    a. a plurality of adapters, each of which comprises an adapter identification means for accommodating the individual products, each individual product comprising an individual product transponder, wherein each individual product is attached to a clothes hanger, which is arranged in a receptacle of one of the adapters,
    b. a transponder reading unit for reading individual product data of the individual product transponder,
    c. an adapter data reading unit for reading adapter data of the adapter identification means, d. a control unit in signal communication with the transponder reading unit and the adapter data reading unit for linking the individual product data read by the transponder reading unit with the adapter data read by the adapter data reading unit, e. a carrier conveyor for carrying the individual products, wherein the carrier conveyer has several carriers for carrying one adapter each in the direction of conveyance, wherein a carrier distance between each two adjacent carriers is independently and variably adjustable in the direction of conveyance, wherein various carrier distances are adjustable in a predefined manner by a carrier spacer grid, wherein the carrier spacer grid is a chain drive system, wherein chain links of the chain drive system form receptacles for in each case one of the carriers.

15. A conveyor device according to claim 14, wherein the carrier drive system has a carrier speed of the carriers in the range between 50 m/min to 60 m/min.

\* \* \* \* \*